US008897550B2

(12) United States Patent
Tong et al.

(10) Patent No.: US 8,897,550 B2
(45) Date of Patent: *Nov. 25, 2014

(54) SYSTEM AND METHOD FOR AUTOMATIC LANDMARK LABELING WITH MINIMAL SUPERVISION

(71) Applicant: NBCUniversal Media, LLC, New York, NY (US)

(72) Inventors: Yan Tong, Schenectady, NY (US); Xiaoming Liu, Schenectady, NY (US); Jilin Tu, Schenectady, NY (US); Peter Henry Tu, Niskayuna, NY (US); Frederick Wilson Wheeler, Niskayuna, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,102

(22) Filed: May 10, 2013

(65) Prior Publication Data
US 2013/0243309 A1    Sep. 19, 2013

Related U.S. Application Data

(63) Continuation of application No. 12/533,066, filed on Jul. 31, 2009, now Pat. No. 8,442,330.

(60) Provisional application No. 61/165,257, filed on Mar. 31, 2009.

(51) Int. Cl.
G06K 9/00    (2006.01)
G06T 7/00    (2006.01)
G06K 9/66    (2006.01)

(52) U.S. Cl.
CPC ............... G06K 9/66 (2013.01); G06T 7/0028 (2013.01); G06T 7/0034 (2013.01); G06T 2207/30201 (2013.01); G06T 2207/20121 (2013.01); G06K 9/00228 (2013.01)
USPC ............ 382/159; 382/118; 382/195; 382/228

(58) Field of Classification Search
USPC .......................... 382/118, 159, 195, 254, 228
See application file for complete search history.

(56) References Cited

U.S. PATENT DOCUMENTS 6,084,989 A      7/2000  Eppler
6,580,811 B2 *   6/2003  Maurer et al. ............... 382/103
6,876,755 B1     4/2005  Taylor et al.
7,054,468 B2     5/2006  Yang
7,412,425 B2     8/2008  Rifkin et al.

(Continued)

OTHER PUBLICATIONS

Cox, Mark, "Least Squares Congealing for Unsupervised Alignment of Images," IEEE International Conference on Computer Vision and Pattern Recognition, Jun. 2008.

Primary Examiner — Gregory M Desire
(74) Attorney, Agent, or Firm — Fletcher Yoder, P.C.

(57) ABSTRACT

A system and method for estimating a set of landmarks for a large image ensemble employs only a small number of manually labeled images from the ensemble and avoids labor-intensive and error-prone object detection, tracking and alignment learning task limitations associated with manual image labeling techniques. A semi-supervised least squares congealing approach is employed to minimize an objective function defined on both labeled and unlabeled images. A shape model is learned on-line to constrain the landmark configuration. A partitioning strategy allows coarse-to-fine landmark estimation.

20 Claims, 5 Drawing Sheets

(56) References Cited

U.S. PATENT DOCUMENTS

| | | |
|---|---|---|
| 7,454,039 B2 | 11/2008 | Tu et al. |
| 7,693,299 B2 | 4/2010 | Vasilescu et al. |
| 7,751,599 B2 | 7/2010 | Chen et al. |
| 7,756,325 B2 | 7/2010 | Vetter et al. |
| 7,804,990 B2 | 9/2010 | Kiraly et al. |
| 8,064,712 B2 | 11/2011 | Wheeler et al. |
| 8,155,399 B2 * | 4/2012 | Liu et al. ............ 382/118 |
| 8,160,332 B2 * | 4/2012 | Von Berg et al. ......... 382/128 |
| 8,218,862 B2 * | 7/2012 | Demirli et al. ............ 382/164 |
| 8,260,039 B2 | 9/2012 | Shiell et al. |
| 2003/0007666 A1 * | 1/2003 | Stewartson et al. ......... 382/103 |
| 2005/0018890 A1 * | 1/2005 | McDonald et al. ......... 382/128 |
| 2006/0080035 A1 * | 4/2006 | Daubert et al. ............ 701/211 |
| 2006/0115145 A1 | 6/2006 | Bishop et al. |
| 2007/0127787 A1 * | 6/2007 | Castleman et al. ......... 382/118 |
| 2007/0237373 A1 | 10/2007 | Kiraly et al. |
| 2009/0066700 A1 | 3/2009 | Harding et al. |
| 2009/0116749 A1 | 5/2009 | Cristinacce et al. |
| 2010/0246980 A1 | 9/2010 | Tong et al. |
| 2011/0058720 A1 * | 3/2011 | Lu et al. ............ 382/131 |
| 2011/0064302 A1 | 3/2011 | Ma et al. |
| 2013/0243309 A1 * | 9/2013 | Tong et al. ............ 382/159 |

* cited by examiner

SYSTEM AND METHOD FOR AUTOMATIC LANDMARK LABELING WITH MINIMAL SUPERVISION

CROSS-REFERENCE TO RELATED APPLICATIONS

This application is a continuation of U.S. patent application Ser. No. 12/533,066 filed on Jul. 31, 2009, which claims priority under 35 U.S.C. §119(e)(1) of U.S. Provisional Application No. 61/165,257, filed Mar. 31, 2009, the full disclosure of which are incorporated herein by reference.

STATEMENT REGARDING FEDERALLY SPONSORED RESEARCH & DEVELOPMENT

This invention was made with U.S. Government support under contract numbers 2007-DE-BX-K191 and 2007-MU-CX-K001. The Government may have certain rights in the invention.

BACKGROUND

This invention relates generally to image labeling, and more particularly, to a system and method for implementing automatic landmark labeling for a predetermined object class.

Image labeling for training data is an essential step in many learning-based vision tasks. There are at least two types of prior knowledge represented by image labeling. One is semantic knowledge, such as human IDs for face recognition, or an object's name for content-based image retrieval. The other is geometric/landmark knowledge. The position of an object (face/pedestrian/car) needs to be labeled for all training images, for example, in learning-based object detection. Each training image must be labeled with a set of landmarks which describe the shape of the face for supervised face alignment.

Geometric/landmark knowledge labeling is typically carried out manually. Practical applications, such as object detection, often require thousands of labeled images to achieve sufficient generalization capability. Manual labeling however, is labor-intensive and time-consuming. Furthermore, image labeling is an error-prone process due to labeler error, imperfect description of the objectives, and inconsistencies among different labelers.

Some notable and early work on unsupervised alignment denotes the process as congealing. The underlying idea is to minimize an entropy-based cost function by estimating the warping parameter of an ensemble. More recently, a least squares congealing (LSC) algorithm has been proposed which uses L2 constraints to estimate each warping parameter. These approaches estimate affine warping parameters for each image. The embodiments described herein estimate non-rigid shape deformation described by a large set of landmarks, rather than the relatively simple global ante transformation.

Additional work on unsupervised image, alignment has incorporated more general deformation models, though not with the use of a well-defined set of landmarks by including a free-form B-spline deformation model. Bootstrapping algorithms to compute image correspondences and to learn a linear model based on optical flow and the use of an iterative Active Appearance Model (AAM) learning and fitting to estimate the location of mesh vertices, reporting results on images of the same person's face have also been developed. Further work formulates AAM learning as an EM algorithm and extends it to learning parts-based models for flexible objects. Other known techniques include 1) the use of a group-wise objective function to compute non-rigid registration, 2) improvements in manual facial landmark labeling based on parameterized kernel PCA, 3) an MDL-based cost function for estimating the correspondences for a set of control points, and 4) alignment by tracking the image sequence with an adaptive template.

Generally, one cannot rely upon unsupervised learning methods to locate landmarks on physically meaningful features of an object, such as mouth/eye corners or nose tip on a face; while supervised facial alignment undesirably requires a large number of labeled training images to train a statistical model so that it can generalize and fit unseen images well.

It would be desirable to provide a system and method that automatically provides landmark labeling for a lare set of images in a fashion that alleviates the foregoing problems.

BRIEF DESCRIPTION

Briefly, in accordance with one embodiment, a method of determining landmark locations comprises automatically propagating a set of landmark points from a small set of images to a large set of images for a predetermined object class.

According to another embodiment, a vision system is configured to automatically propagate a set of landmark points from a small set of images to a large set of images for a predetermined object class in response to an algorithmic software.

DRAWINGS

These and other features, aspects, and advantages of the present invention will become better understood when the following detailed description is read with reference to the accompanying drawings in which like characters represent like parts throughout the drawings, wherein.

Figure 1:
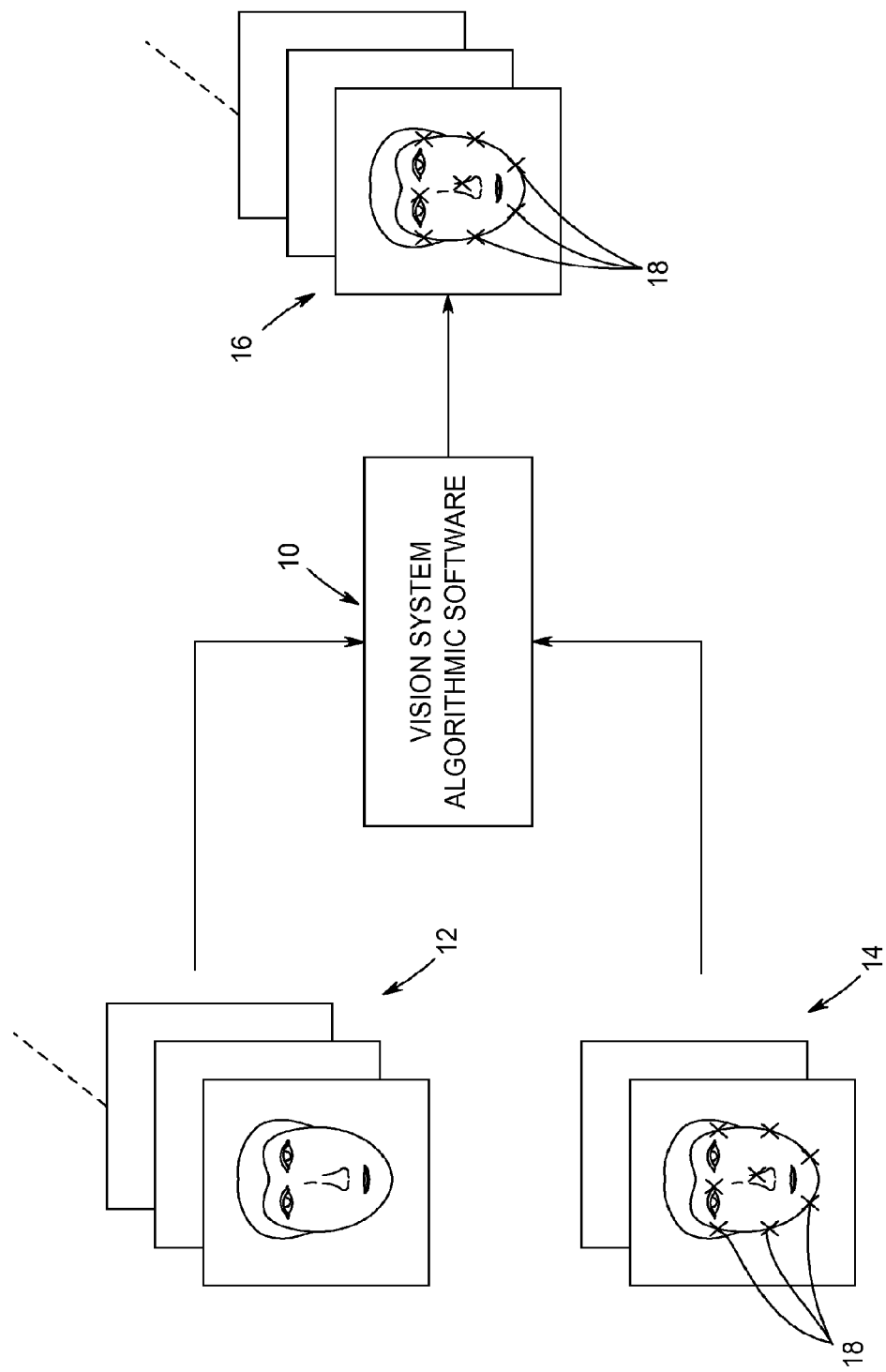
FIG. 1 is a simplified diagram illustrating a vision system configured to automatically propagate a set of landmark points from a small set of images to a large set of images for a predetermined object class in response to an algorithmic software according to one embodiment.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The following preliminary discussion presents a framework to provide a better understanding of the system and method embodiments described thereafter with reference to the Figures that are directed to automatic landmark labeling for a large set of images in a semi-supervised fashion. These embodiments automatically estimate the landmark locations for a full set of images such as, for example, a complete training set of 300 images using manually labeled landmark locations for a few images such as, for example, 10 manually labeled images.

According to one aspect, a semi-supervised least squares congealing (SLSC) method minimizes an objective function defined as the summation of pairwise L2 distances between warped images. Two types of distances are utilized including the distance between the labeled and unlabeled images, and the distance between the unlabeled images. The objective function is iteratively minimized via an inverse warping technique. During the optimization process, estimated landmark locations are constrained according to one embodiment by utilizing shape statistics learned from relatively low-error estimations in an on-line manner, which was found to yield better convergence of landmark position estimates.

Modern work on joint alignment for an image ensemble mainly estimates global affine parameters for each image. The present inventors recognized however that most real-world objects exhibit non-rigid deformation that is not well-modeled by the affine transformation, and that estimating more realistic deformations using a large set of landmarks would provide an important step toward accurately characterizing the shape variation within an object class.

Hierarchical patch-based embodiments that estimate landmark positions are thus described herein. Patches, starting from a whole warped image region treated as the first level patch, are iteratively partitioned into smaller child patches, in which initial landmark locations are obtained from the parent patch and whose refined landmark estimations result in an accurate landmark labeling based on the local patch appearance. Applications in facial images were found by the present inventors to demonstrate that by labeling only 1% to 3% of the ensemble, the landmarks of the remaining images could be accurately estimated.

An automatic image labeling framework according to one embodiment has three main contributions including:

1) a core methodology for (described herein with reference to Equation 1 below) semi-supervised least-squares-based alignment of an image ensemble, described herein using the inverse warping technique;

2) two additional methodologies (described herein with reference to Algorithms 1 and 2 below) for improving landmark estimation via i) a statistical shape model learned on-line to reduce outliers among the ensemble, and ii) patch-based partitioning to improve the precision of landmark estimation; and 3) an end-to-end system for automatic estimation of a set of landmarks in an ensemble of the images for a predetermined object class with very few manually labeled images and described herein with reference to FIGS. 1 and 2.

FIG. 1 is a simplified diagram illustrating a vision system 10 that may be a computer vision system configured to automatically propagate a set of landmark points from a small set of images 14 to a large set of images 16=images 12+images 14 for a predetermined object class in response to an algorithmic software according to one embodiment.

Figure 2:
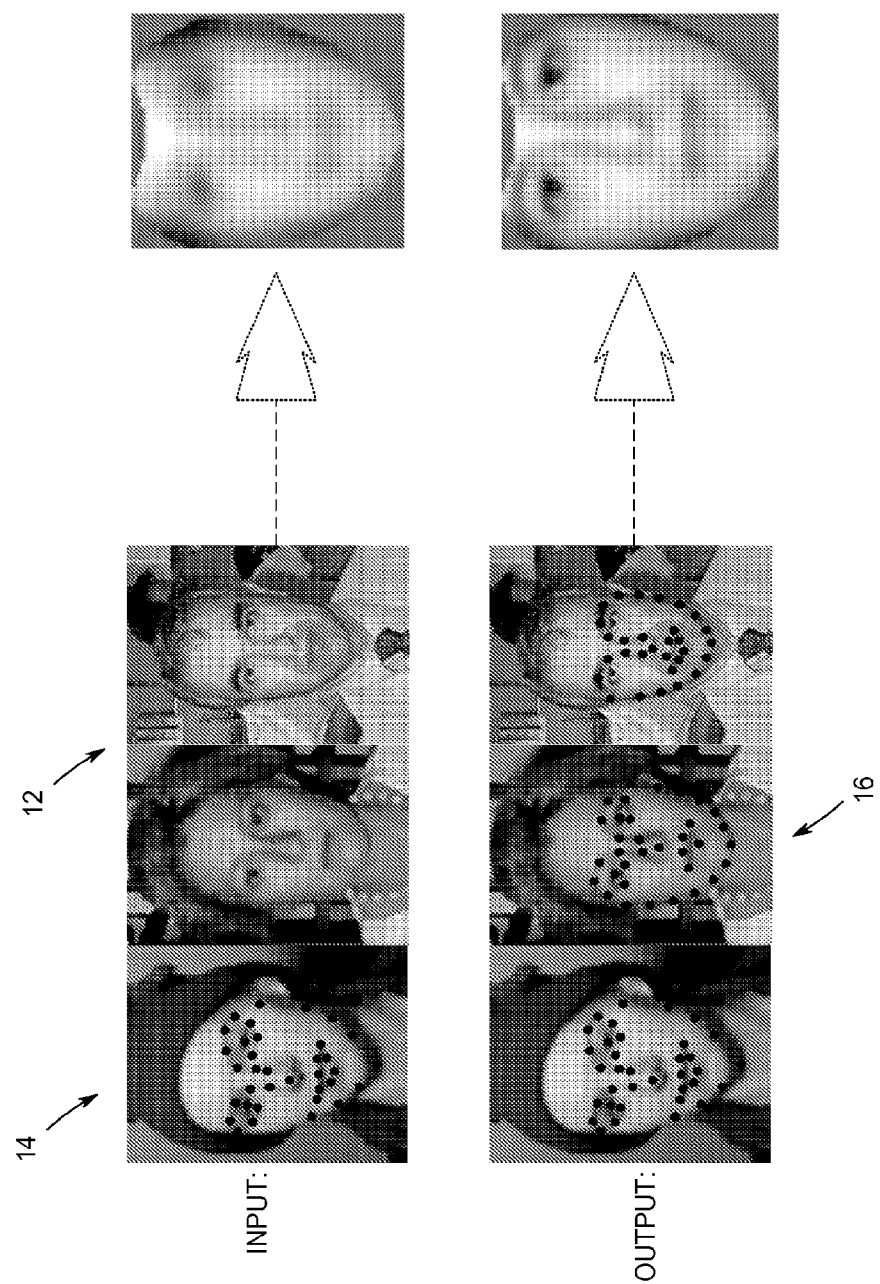
FIG. 2 illustrates exemplary input data and output data for the vision system illustrated in FIG. 1 according to one embodiment.

FIG. 2 illustrates exemplary input data 12, 14 and output data 16 for the vision system 10 illustrated in FIG. 1 according to one embodiment.

The embodiments described herein address discovery of non-rigid shape deformation using a specific set of physically defined landmarks enumerated 18 in FIG. 1 and semi-supervised learning in which prior knowledge of landmark location(s) can advantageously be incorporated easily via a few manually labeled examples. Given an ensemble of images 12, 14, where a few manually labeled images 14 have known warping parameters, the embodied SLSC approach estimates the warping parameters of the remaining unlabeled images 12 using the cost function:

$$\varepsilon(P) = \sum_{i=1}^{K} \varepsilon_i(p_i) \quad (1)$$

$$= \sum_{i=1}^{K} \frac{1-\alpha}{K-1} \sum_{j=1, j \neq i}^{K} \|I_j(W(x; p_j)) - I_i(W(x; p_i))\|^2 +$$

$$\sum_{i=1}^{K} \frac{\alpha}{\tilde{K}} \sum_{n=1}^{\tilde{K}} \|\tilde{I}_n(W(x; \tilde{p}_n)) - I_i(W(x; p_i))\|^2,$$

where $\tilde{K}$ is the number of labeled images $\tilde{I} = \{\tilde{I}_n\}_{n \in [1, \tilde{K}]}$, and K is the number of unlabeled images $I = \{I_i\}_{i \in [1, K]}$, $p_i$ is an m-dimensional warping parameter vector to warp $I_i$ to a common mean shape using a warping function $W(x; p_i)$, which can be a simple affine warp or a complex non-rigid warp such as the piecewise affine warp. $I_i(W(x; p_i))$ is the corresponding N-dimensional warped image vector. $\tilde{p}_n$ is the known warping parameter vector for $\tilde{I}_n$. x is a collection of N pixel coordinates within the mean shape. $P = [p_1, \ldots, p_K]$ contains all the warping parameters for I that need to be estimated by minimizing $\varepsilon(P)$. Since $\varepsilon(P)$ is difficult to optimize directly, $\varepsilon_i(p_i)$ is iteratively minimized for each $I_i$. In the cost function, $\varepsilon_i(p_i)$ equals the summation of the pairwise difference between $I_i$ and all the other images in the warped image space. On the one hand, minimizing the 1$^{st}$ term of Eqn. (1) makes the warped image content of the i$^{th}$ unlabeled image similar to that of the other unlabeled images, without regard for the physical meaning of the content. On the other hand, the 2$^{nd}$ term of Eqn. (1) constrains $I_i(W(x; p_i))$ to be similar to those of the labeled images and enforces the physical meaning of the content during alignment. Thus, the labels of $\tilde{I}$ are propagated to I. Since $K \gg \tilde{K}$, a weighting coefficient $\alpha$ can balance the contributions of the two terms in the overall cost.

An inverse warping technique is employed to minimize $\varepsilon_i(p_i)$. Warping parameter updates $\Delta p_i$ are first estimated by minimizing the following equation:

$$\varepsilon_i(\Delta p_i) = \frac{1-\alpha}{K-1} \sum_{j=1, j \neq i}^{K} \|I_j(W(W(x; \Delta p_i); p_j)) - I_i(W(x; p_i))\|^2 + \quad (2)$$

$$\frac{\alpha}{\tilde{K}} \sum_{n=1}^{\tilde{K}} \|\tilde{I}_n(W(W(x; \Delta p_i); \tilde{p}_n)) - I_i(W(x; p_i))\|^2$$

and then update the warping function by:

$$W(x; p_i) \leftarrow W(x; p_i) \circ W(x; \Delta p_i)^{-1} \quad (3)$$

The function $\varepsilon_i(\Delta p_i)$ is nonlinear with respect to $\Delta p_i$. To support numeric optimization of this function, a first order Taylor expansion is performed on $I_j(W(W(x; \Delta p_i); p_j))$ and $\tilde{I}_n(W(W(x; \Delta p_i); \tilde{p}_n))$ to yield:

$$I_j(W(W(x; \Delta p_i); p_j)) \approx I_j(W(x; p_j)) + \frac{\partial I_j(W(x; p_j))}{\partial p_j} \Delta p_i.$$

As a result, Eqn. (2) is simplified to:

$$\frac{1-\alpha}{K-1}\sum_{j=1,j\neq i}^{K}\|b_j+c_j\Delta p_i\|^2 + \frac{\alpha}{\tilde{K}}\sum_{n=1}^{\tilde{K}}\|b_n+c_n\Delta p_i\|^2 \quad (4)$$

where $$b_j = I_j(W(x;p_j)) - I_i(W(x;p_i)), \quad c_j = \frac{\partial I_j(W(x;p_j))}{\partial p_j},$$

$$b_n = \tilde{I}_n(W(x;\tilde{p}_n)) - I_i(W(x;p_i)), \quad c_n = \frac{\partial \tilde{I}_n(W(x;\tilde{p}_n))}{\partial \tilde{p}_n}.$$

The least squares solution of Eqn. (4) yields:

$$\Delta p_i = -H^{-1}\left[\frac{1-\alpha}{K-1}\sum_{j=1,j\neq i}^{K}c_j^T b_j + \frac{\alpha}{\tilde{K}}\sum_{n=1}^{\tilde{K}}c_n^T b_n\right], \quad (5)$$

with $$H = \frac{1-\alpha}{K-1}\sum_{j=1,j\neq i}^{K}c_j^T c_j + \frac{\alpha}{\tilde{K}}\sum_{n=1}^{\tilde{K}}c_n^T c_n. \quad (6)$$

The computational cost for solving the second term of Eqn. (4) is negligible. Therefore, semi-supervised congealing has a computational cost similar to that of unsupervised congealing. According to one aspect, a shape-constrained SLSC improves the robustness of the congealing process by reducing outliers. According to another aspect, this is extended to a patch-based approach to achieve an accurate estimate of the landmarks by partitioning the mean shape space.

Given the warping parameters for all images $\{P,\tilde{P}\}=[p_i,\ldots,p_K,\tilde{p}_1,\ldots,\tilde{p}_{\tilde{K}}]$, and their corresponding landmark locations $\{S,\tilde{S}\}=[s_1,\ldots,s_K,\tilde{s}_1,\ldots,\tilde{s}_{\tilde{K}}]$, where s is a concatenated vector of a set of 2D landmark coordinates $s=[x_1,y_1,x_2,y_2,\ldots,x_v,y_v]^T$, there are two ways of mapping between $\{P,\tilde{P}\}$ and $\{S,\tilde{S}\}$. First, the landmarks $s_i$ can be obtained from the warping parameter $p_i$ via $s_i=W(x_s;p_i)$, where $x_s$ is a vector containing the coordinates of the target landmarks in the mean shape space. As a result, an incorrect warping parameter, which can result from an outlier in the congealing process, would produce a landmark set that is not a valid shape instance. Second, the warping parameter $p_i$ can be obtained given the corresponding landmark pairs ($x_s$ and $s_i$). Consequently, refining the positions of the landmarks can improve the estimation of the warping parameters. A shape-constrained SLSC (SSLSC) approach described herein integrates the shape constraints with the appearance-based congealing process to improve the robustness of the SLSC.

Given that the objects in the images have the same topological structure, an assumption is made that the shape deformation of $s_i$ satisfies a Point Distribution Model (PDM). Since only a few labeled images are available, the PDM is learned from both the labeled landmarks and an automatically chosen low-error subset of the estimated landmarks in an online manner. Then, any other poor estimations can be "corrected" through a PCA reconstruction as follows:

$$\hat{s}_i = \bar{s} + Qz \quad (7)$$

where $\hat{s}_i$ is the reconstructed shape vector for the $i^{th}$ image; $\bar{s}$ and Q are the mean shape and the shape basis obtained through the on-line training; and z is the shape parameter vector that is restricted in some range. Finally, a new warping parameter vector $\hat{p}_i$ is computed from the refined landmark positions $\hat{s}_i$ such that the outliers of the congealing process are discovered and constrained in a principled way.

The SSLSC is summarized as Algorithm 1 below, where $P^0$ represents the initial warping parameters for I. The labeled landmarks are fully utilized in the sense that they not only contribute for the cost minimization for Eqn. (2), but also provide guidance for shape deformation.

---
Algorithm 1 Shape-constrained SLSC (SSLSC)
---

Input: I, Ĩ, $P^0$, $\tilde{P}$, x, and $x_s$
Output: $P^t$, $S^t$, and $\in$
   t ← 0;
   Compute $\tilde{s}_i = W(x_s; \tilde{p}_i)$ for $i \in [1,\tilde{K}]$;
   repeat
      for i = 1 to K do
         $\in_i(\Delta p_i)$, $p_i^{t+1}$ ← SLSC(I, Ĩ, $P^t$, $\tilde{P}$, x);
      end for
      Rank $\in_1(\Delta p_1), \ldots, \in_K(\Delta p_K)$ in ascending order and pick the first $K_M$ images;
      Compute $s_i^{t+1} = W(x_s; p_i^{t+1})$ for $i \in [1, K_M]$;
      $\bar{s}$, Q, λ ← PCA on $S = [\tilde{s}_1, \ldots, \tilde{s}_{\tilde{K}}, s_1^{t+1}, \ldots, s_{K_M}^{t+1}]^T$;
      for i = $K_M$ + 1 to K do
         Reconstruct $s_i^{t+1}$ as Eqn. (7);
         Compute $p_i^{t+1}$ from $s_i^{t+1}$;
      end for
      $P^{t+1}$ ← $[p_1^{t+1}, \ldots, p_K^{t+1}]$; $S^{t+1}$ ← $[s_1^{t+1}, \ldots, s_K^{t+1}]^T$;
      $\varepsilon \leftarrow \sum_{i=1}^{K}\varepsilon_i(\Delta p_i)$; t ← t + 1.
until Converge

---

The warping function $W(x; p_i)$ can be a simple global affine warp to model rigid transformation, or a piecewise affine warp to model non-rigid transformation. The SSLSC algorithm does not however, perform satisfactorily with direct use of the piecewise affine warp. This difficulty is related to the high dimensionality of the warping parameter $p_i$. Looking at the piecewise affine warp closely, it can be noted that the warping function W is a series of affine transformations, each operating within a small triangular patch. While the patch allows a workspace whose dimension is much smaller than the original space, and thus makes the problem easier to solve, directly applying the SSLSC on the small patches is not reliable due to the poor initialization and limited information encoded in the patch. Based on these observations, a coarse-to-fine partition-based congealing method improves the precision of landmark labeling.

Figure 3:
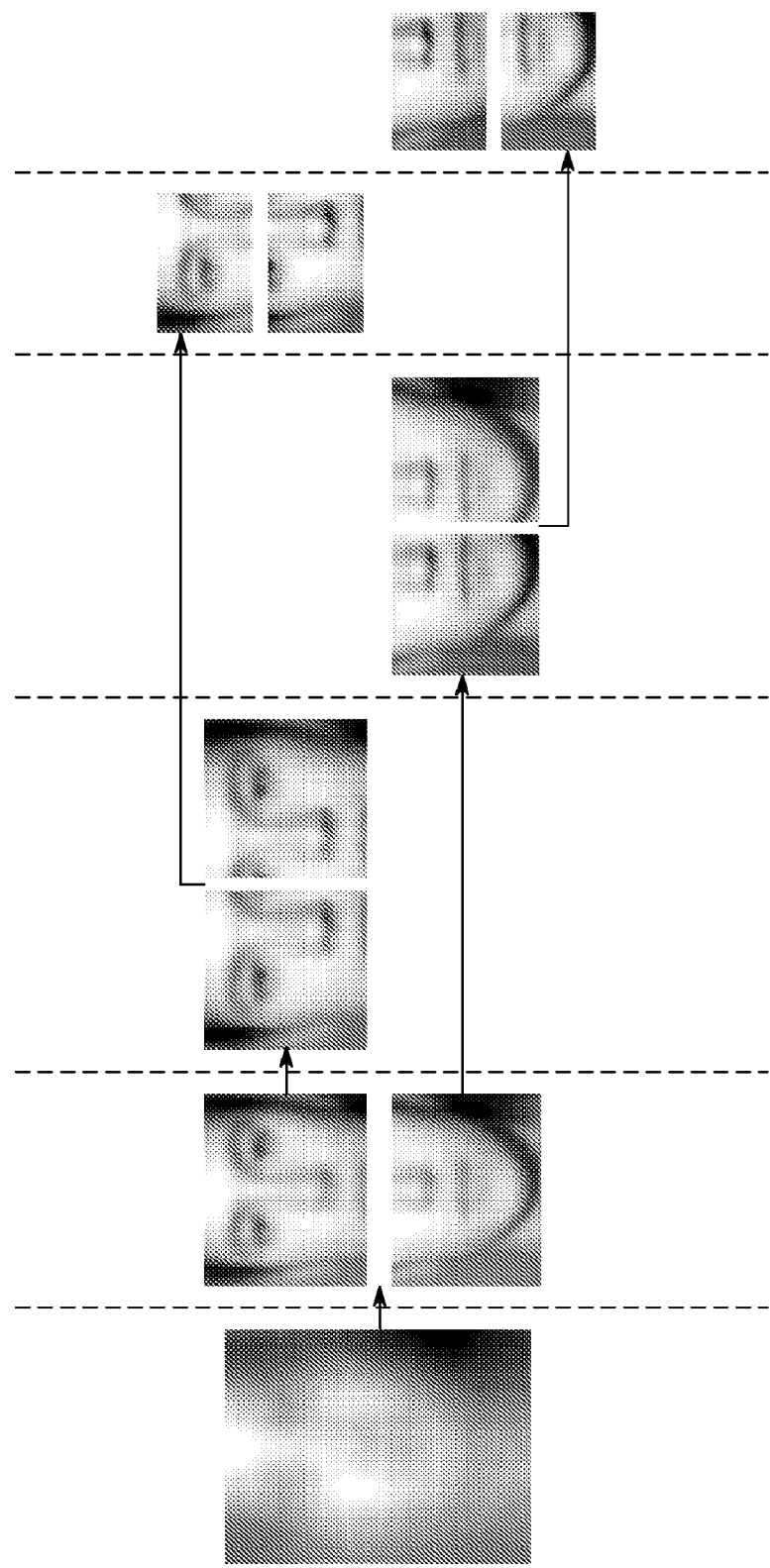
FIG. 3 illustrates multi-level partitioning according to one enmbodiment.

The partitioning strategy is summarized as Algorithm 2 below, where $S_{init}$ is the initial guess of the landmark positions for I. In the algorithm, besides the notation mentioned previously, R represents the indices of the patches to be aligned in the current partition level; d represents the index of the patch. Starting from the initial mean shape space $x^1$, the process is conducted by repeatedly partitioning the mean shape space for a selected patch ($x^{k^{**}}$) which has the maximal congealing error ($\epsilon$), into multiple child patches. In one embodiment, two equal sized child patches are generated by each partitioning. To enforce a geometrical relationship between the child patches, they are overlapped such that some landmarks reside in both of them. Positions of these landmarks are estimated as averages of the SSLSC results of the two child patches. After the partitioning, the SSLSC is applied on each child patch, independently, to obtain the corresponding landmark positions within the patch itself. The partitioning is stopped when no cost reduction is achieved or the size of the patch is too small. According to one embodiment, the patch reaches its size limit if the number of target landmarks in $x^d$ is less than the number of corresponding landmarks required for computing $p_i$. One example of multiple level partitioning is shown in FIG. 3.

---

Algorithm 2 Landmark Labeling by Partition

---

Input: I, Ĩ, $S_{init}$, S̃
Output: S
$l_{min}$ ← minimum number of landmarks in a patch;
d ← 1; R ← {1}, $S_{init}^1$ ← $S_{init}$;
Compute $x^1$ and $x_s^1$ from S̃;
while d < maximum number of patches do
   for each r ∈ R do
      Calculate $P_{init}^r$ and $\tilde{P}^r$ from $S_{init}^r$, $x_s^r$, S̃, and $x_s^r$, respectively;
      $P^r$, $S^r$, $\mathcal{E}^r$ ← SSLSC(I, Ĩ, $P_{init}^r$, $\tilde{P}^r$, $x^r$, $x_s^r$);
      if no cost reduction is achieved in r over its parent patch then
         return $S^{d-2}$ // return labeling results of last partition level;
      end if
   end for
   k∗ = $\underset{k}{\text{argmax}}$ $\varepsilon^k$, k ∈ [1, d];
   child patches $x^{d+1}$, $x^{d+1}$, $x_s^{d+1}$, $x_s^{d+2}$ ← Partition the $k^{*th}$ patch;
   $S_{init}^{d+1}$ ← $S^{k*}$; $S_{init}^{d+2}$ ← $S^{k*}$; $\mathcal{E}^{k*}$ ← 0;
   if size($x_s^{d+1}$) < $l_{min}$ or size($x_s^{d+1}$) < $l_{min}$ then
      return $S^d$;
   end if
   d ← d + 2; R ← {d + 1, d + 2};
end while

---

The top-down congealing strategy performs a coarse-to-fine alignment for the entire image ensemble. The congealing in the coarse level partition focuses on aligning the features that are most similar among the image ensemble such as eyes on the face, whereas the other features like nose and mouth are neglected. Hence, the landmark estimation on the larger patches is often coarse and used to provide a good initialization for the latter levels. With the increasing of the partition level, more details of the target object are revealed. As a result, the estimation of the landmarks becomes more and more precise.

The effectiveness of the landmark labeling methods described herein has been demonstrated in one application by automatically annotating 33 specific landmarks around facial features (i.e., eyes, eyebrows, nose, mouth, and contour) for a large image set, given a few labeled images. For this application, 300 images were collected from a known database in which the facial regions were unaligned. Then, 33 landmarks were labeled for each image to establish a ground truth and to enable a quantitative evaluation for the labeling performance.

The 300 labeled images were divided into two non-overlapping sets: a labeled set with K̃ images and an unlabeled set with 300−K̃ images. The initial value of the $j^{th}$ element of $S_i$ was generated for quantitative evaluation by adding a uniformly distributed random noise $\eta \in [-\eta_{max}, \eta_{max}]$ to the ground truth value $\hat{S}_{i,j}$ as follows, $$S_{i,j} = \hat{S}_{i,j} + \frac{\eta \rho_i}{\bar{\rho}} \quad (8)$$

where $\rho_i$ is the eye-to-eye pixel distance of $I_i$, and $\bar{\rho}$ is the average of $\rho_i$ for all unlabeled images. By doing so, the level of deviation in the initialization is relative to face size. In practical applications, the initial landmark positions can be obtained from the approximate face location. A 6-parameter affine transformation was employed in the congealing process, and a 72×72 square region, which encloses all the target landmarks, was used as the common mean shape. The warped face region was normalized by subtracting its mean intensity value and then divided by its standard deviation to accommodate illumination changes.

The effectiveness was evaluated using two criteria: (1) Normalized Root Mean Squared Error (NRMSE) of landmarks defined as the RMSE with respect to the ground truth divided by the eye-to-eye distance $\rho_i$, and expressed as a percentage; and (2) the Sample "Outliers" Fraction (SOF) defined as the number of images, of which the NRMSE exceeds a threshold (10%), versus the number of unlabeled images. A smaller NRMSE indicates a higher labeling accuracy, and a smaller SOF represents greater robustness.

Figure 4:
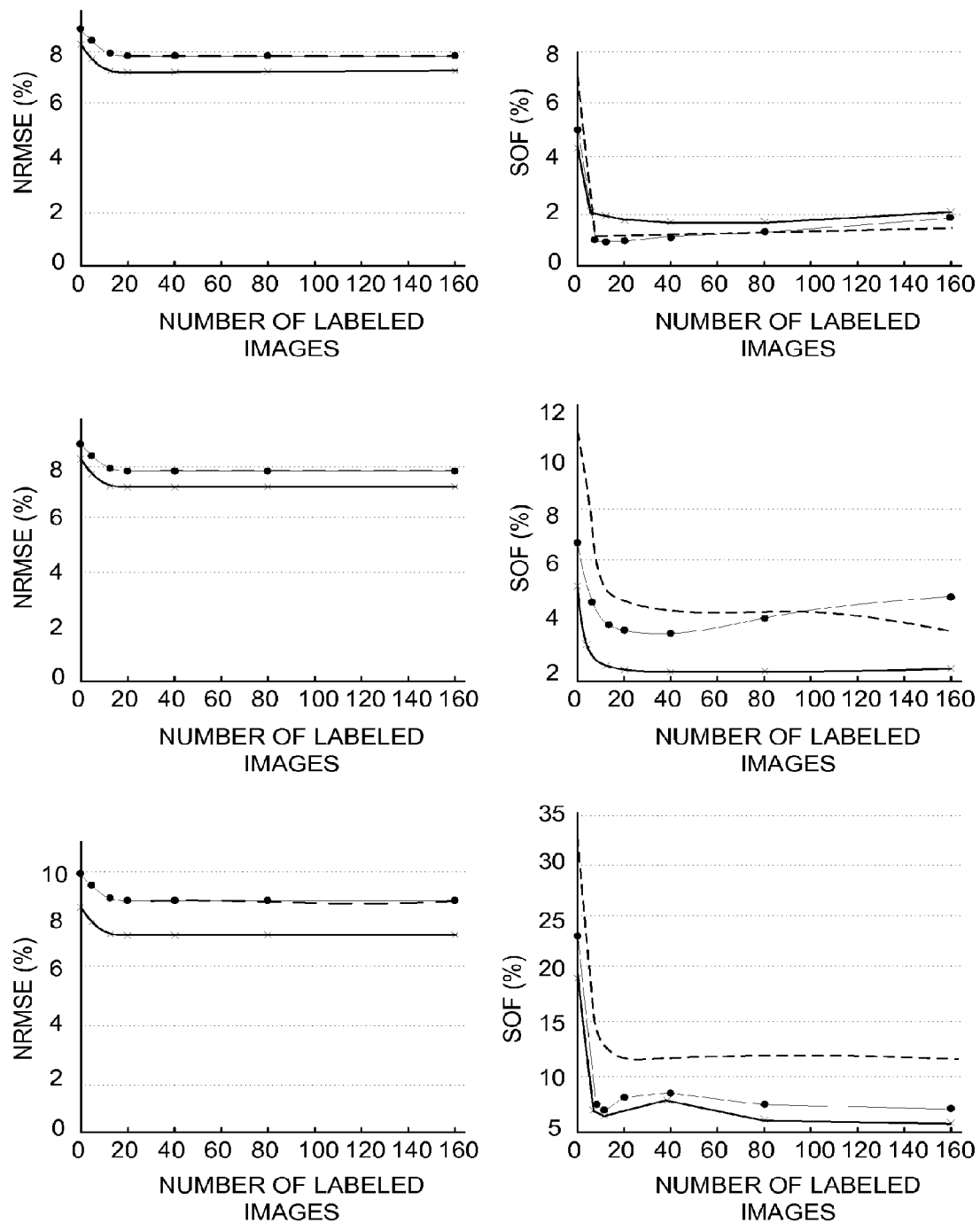
FIG. 4 is a set of graphs illustrating a performance comparison for SLSC, SSLSC and partition-based SSLSC in terms of NRMSE of landmarks excluding outliers (%) and SOF (%) according to one embodiment.

The effectiveness of using a shape-constrained SLSC is first compared with using SLSC under the effects of varying number of labeled images K̃ ∈ {1, 5, 10, 20, 40, 80, 160} and different noise levels $\eta_{max}$ ∈ {10, 30, 50}. FIG. 4 illustrates the performance comparison in terms of NRMSE and SOF in which SLSC is represented by the dashed line, SSLSC is represented by the line with circles, and SSLSC is represented by the line with crosses. The left side graphs are in terms of NRMSE of landmarks excluding outliers (%). The right side graphs are in terms of SOF (%). The results in each row correspond to a noise level ($\eta_{max}$=10, 30, 50) respectively. Note that, for this result, outliers were excluded from the computation of NRMSE. The results were computed from an average of 5 trials, where K̃ images were randomly selected as the labeled set for each trial. Both algorithms were compared under the same conditions. Both algorithms used, the example, the same randomly selected labeled set and the same initialization.

Comparing the results of SLSC and SSLSC in FIG. 4, the shape constraints are effective in reducing the outliers significantly, even when the congealing performance of SLSC is poor due to a high initialization noise level and a small number of labeled images. For example, the SOF decreases from 32% (SLSC) to 23.4% (SSLSC) with K̃=1 and $\eta_{max}$=50, which is equivalent to removing 26 outliers. Furthermore, an average of 5.2% reduction of SOF is obtained when $\eta_{max}$=50. Since the shape constraints are not applied on those low-error estimations, there is no improvement in the NRMSE excluding outliers.

FIG. 4 also illustrates the improvement of labeling accuracy by partition-based SSLSC. Similar to the previous results for SSLSC, the performance was evaluated under varying K̃ and $\eta_{max}$ values from an average of 5 random trials, as shown in FIG. 4. Comparing the results of SSLSC and partition-based SSLSC in FIG. 4, it is obvious that the partition-based approach further improves both precision and robustness in terms of reducing the NRMSE and SOF. The SOF for example, decreases from 23.4% (SSLSC) to 20.3% (partition-based SSLSC), and the NRMSE decreases from 9.92% (SSLSC) to 9.06% (partition-based SSLSC) with K̃=1 and $\eta_{max}$=50. In summary, an average of 1% reduction of NRMSE is achieved for all noise levels, and an average of 2% decrease of SOF is obtained for high noise levels ($\eta_{max}$=30, 50). FIG. 4 illustrates there is no remarkable improvement when K̃>=10, which means that only using 3% (10/300) labeled data, the landmarks can be estimated accurately and robustly.

Figure 5:
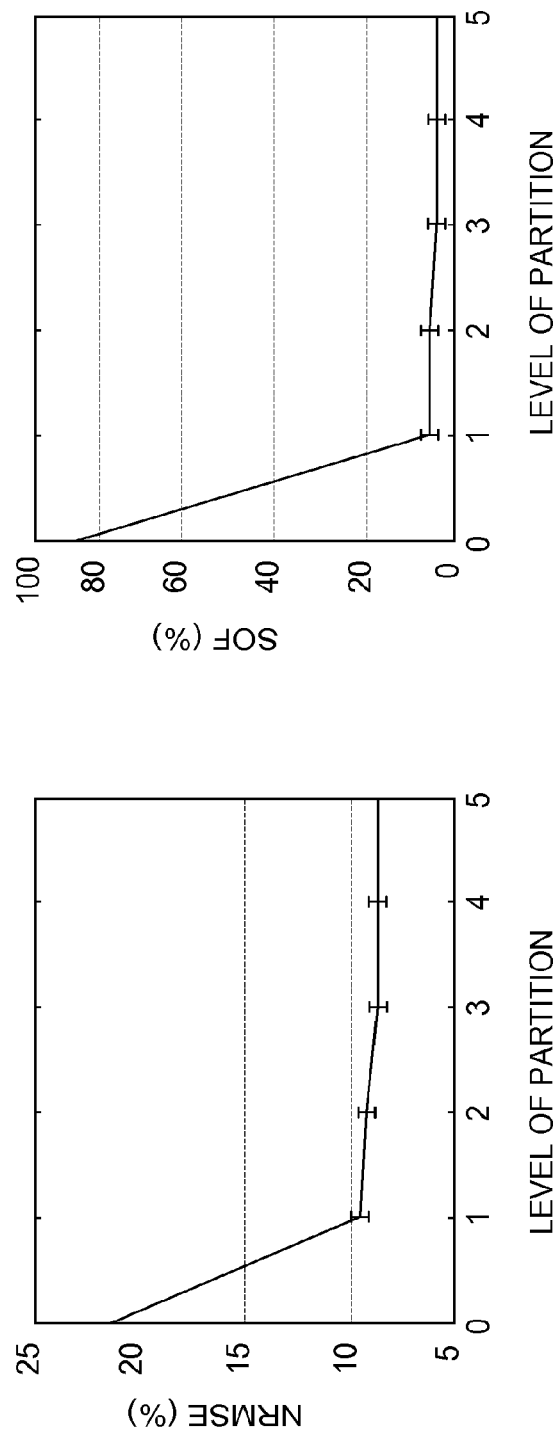
FIG. 5 is a set of graphs illustrating performance analysis by varying partition levels in terms of NRMSE of landmarks and SOF according to one embodiment.

FIG. 5 illustrates the performance improvement across different partition levels when K̃=5 and $\eta_{max}$=30. The results of level-0 correspond to the initialization, and those of level-1 represent the congealing results on the whole mean shape space by SSLSC. Increasing levels of partition, both the NRMSE and SOF decrease and converge at the last paration level as illustrated in FIG. 5.

In summary explanation, shape deformation of images of a real-world object is often non-rigid due to inter-subject variability, object motion, and camera view point. Automatically estimating non-rigid deformations for an object class is a critical step in characterizing the object and learning statistical models. The system and method embodiments described herein facilitate such a task by automatically producing labeled data sets. Extensive experiments have demonstrated these methods achieve impressive labeling results on facial images with nearly frontal view and moderate changes in expression, useful for many current applications. The invention is not so limited however as these embodiments can be immediately applied to the task of labeling landmarks in images of other classes of objects such as vehicles or pedestrians using the principles described herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
via a computer processor:
identifying a whole warped image as a first level patch;
obtaining initial landmark locations from the first level patch;
iteratively partitioning the whole warped image region into smaller child patches; and
refining landmark estimations from the initial landmark locations to establish accurate landmark labeling based on resultant patch appearance.

2. The method of claim 1, wherein obtaining the initial landmark locations comprises importing the initial landmark locations into a computer in response to algorithmic software.

3. The method of claim 2, comprising manually labeling the initial landmark locations.

4. The method of claim 1, comprising propagating the initial landmark locations from a first set of images to a second set of images that is larger than the first set of images using a computer in response to algorithmic software.

5. The method of claim 4, wherein the first set of images is within an object class and the second sets of images is within the object class.

6. The method of claim 4, wherein the first set of images comprises from about 1% to about 3% of the second set of images.

7. The method of claim 1, comprising performing landmark estimations including minimizing an objective function defined as a summation of pairwise L2 distances between warped images.

8. The method of claim 7, wherein the pairwise L2 distances are selected from the distance between labeled and unlabeled images and the distance between unlabeled images.

9. The method of claim 7, wherein minimizing the objective function comprises iteratively minimizing the objective function via inverse warping.

10. The method of claim 7, comprising processing the objective function based on semi-supervised least squares congealing.

11. The method of claim 1, comprising generating output data including a set of images.

12. A method comprising:
via a computer processor:
performing a semi-supervised least-squares-based alignment of an image ensemble using an inverse warping technique;
determining estimated warping parameters of unlabeled images in the image ensemble based on known warping parameters of labeled images of the image ensemble using results of the semi-supervised least-squares-based alignment;
reducing outliers of the estimated warping parameters by partitioning a mean shape space of the semi-supervised least-squares-based alignment, wherein partitioning the means shape space includes iteratively partitioning an initially identified patch corresponding to an image of the image ensemble into child patches; and
refining landmark estimations based on resultant patch appearance.

13. The method of claim 12, comprising estimating landmark point locations including minimizing an objective function defined as a summation of pairwise L2 distances between warped images.

14. The method of claim 12, comprising propagating the initially identified patch to a set of images using a computer in response to algorithmic software.

15. The method of claim 12, comprising generating output data including a set of images.

16. The method of claim 12, comprising importing the labeled images into a computer in response on algorithmic software, wherein the labeled images are manually labeled.

17. A tangible, non-transitory, computer readable medium comprising machine-readable instructions to:
perform a semi-supervised least-squares-based alignment of an image ensemble using an inverse warping technique;
determine estimated warping parameters of unlabeled images in the image ensemble based on known warping parameters of labeled images of the image ensemble using results of the semi-supervised least-squares-based alignment;
reduce outliers of the estimated warping parameters by partitioning a mean shape space of the semi-supervised least-squares-based alignment, wherein partitioning the means shape space includes iteratively partitioning an initially identified patch corresponding to an image of the image ensemble into child patches; and
refine landmark estimations based on resultant patch appearance.

18. The computer readable medium of claim 17, wherein the instructions instruct a computer to import the initial landmark locations into the computer system.

19. The computer readable medium of claim 17, wherein the instructions generate output data including an output set of images.

20. The computer readable medium of claim 19, wherein the initial landmark locations are based on an input set of images and the output set of images are larger in number than the input set of images.

* * * * *